United States Patent [19]
Newman

[11] 3,742,119
[45] June 26, 1973

[54] TERMINAL HOUSING
[75] Inventor: Albert P. Newman, Cincinnati, Ohio
[73] Assignee: Empire Products, Inc., Cincinnati, Ohio
[22] Filed: Nov. 11, 1971
[21] Appl. No.: 197,665

[52] U.S. Cl............ 174/65 R, 174/155, 248/68 CB
[51] Int. Cl............................................. H02g 3/18
[58] Field of Search................ 174/48, 65 R, 65 G, 174/152 R, 152 G, 153 G, 155, 156, 157; 248/67.5, 68 CB

[56] References Cited
UNITED STATES PATENTS
3,328,513  6/1967  Goldsobel.................... 174/155 X
3,531,071  9/1970  Kubli............................ 248/68 CB
3,260,790  7/1966  Alsop............................ 174/65 G
3,597,523  8/1971  Guritz............................... 174/48

Primary Examiner—Bernard A. Gilheany
Assistant Examiner—D. A. Tone
Attorney—John W. Melville, Albert E. Strasser et al.

[57] ABSTRACT

A terminal housing, having an electrical connector integral therewith, into which multiple conductor electrical cables may be brought and joined in electrical contact with said electrical conductor. Means are provided for securing said cables against movement relative to said housing, and to seal said housing against penetration by a liquid. Said means comprising a plurality of resilient members each interengagable with another, and containing hemispherical depressions through which said cables are brought into said housing.

5 Claims, 4 Drawing Figures

PATENTED JUN 26 1973 3,742,119
SHEET 1 OF 2
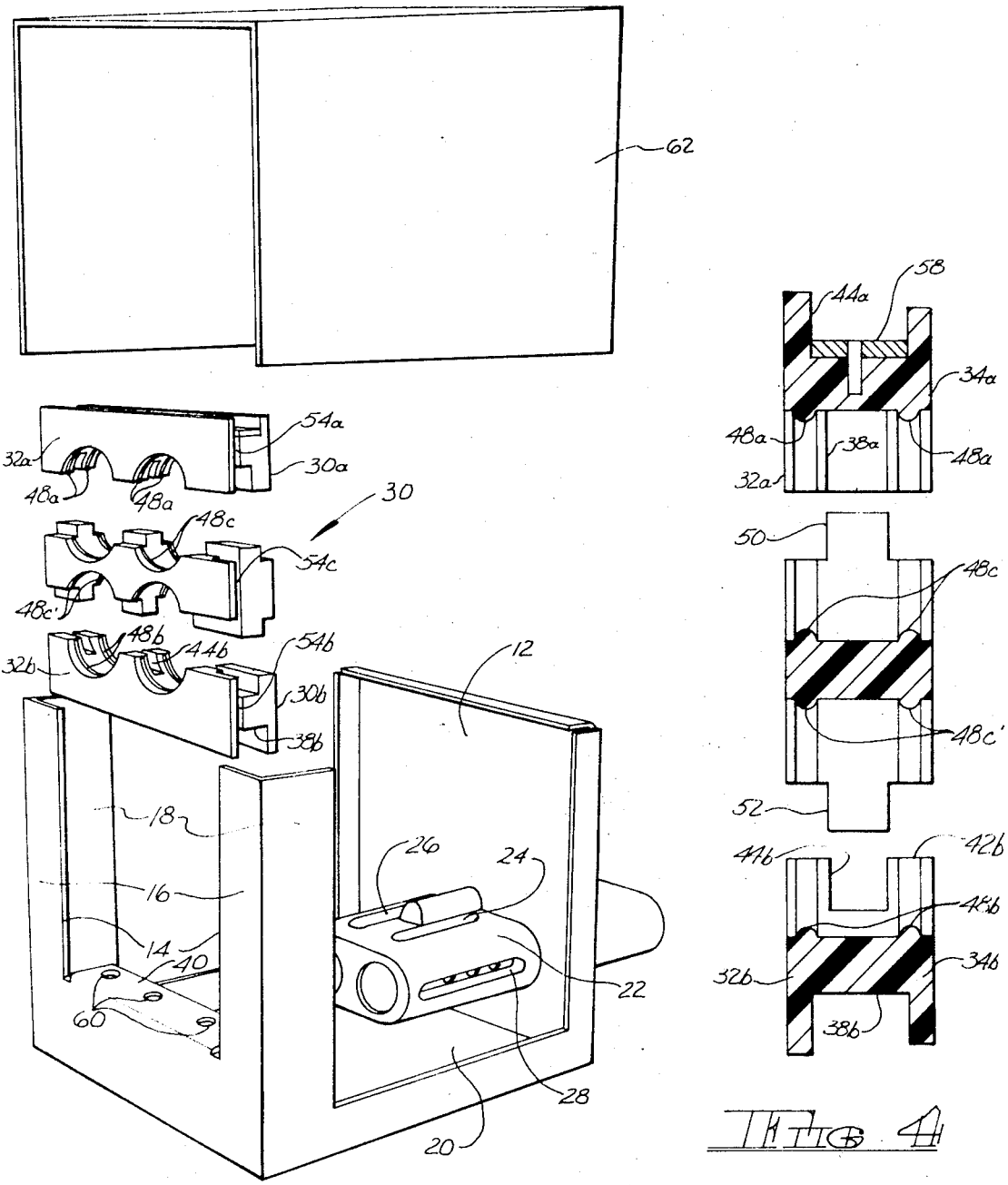
INVENTOR
ALBERT P. NEWMAN
BY Melville, Strasser, Foster and Hoffman
ATTORNEYS

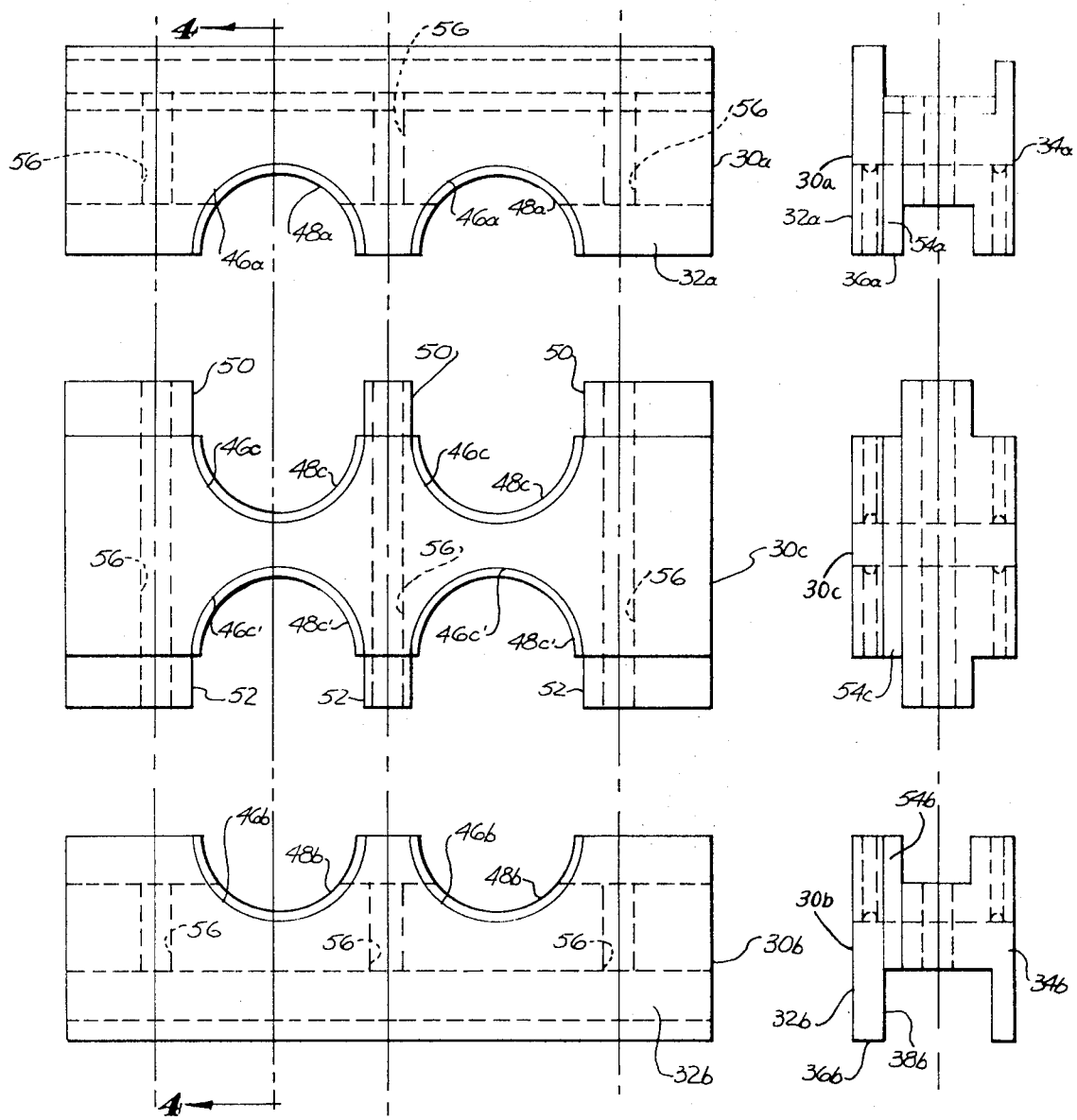

3,742,119

TERMINAL HOUSING

BACKGROUND OF THE INVENTION

This invention relates to a terminal housing through which a plurality of cables pass. Unique supporting means are provided to secure said cables relative to the housing, and to protect the interconnections thereof against damage by penetrating liquids.

Heretofore attempts have been made to protect or anchor cable assemblies, but without significant effect in achieving both objectives. In the very early patent to F.C. Woods, U. S. Pat. No. 954,842, a terminal box is taught which mechanically anchors the cables to the housing. No suggestion is offered as to how one might seal the cables or support sections to prevent any penetration by liquids such as water.

The later patents to E. M. Morehouse and A. F. Kubli, U. S. Pat. Nos. 2,417,260 and 3,531,071, respectively, are merely mechanical clamping devices to hold conduit passing therethrough. Such supports do not prevent axial or longitudinal movement of the cables, nor do they protect against the passage of liquid therethrough.

The foregoing shortcomings are not found in the present invention.

SUMMARY OF THE INVENTION

The objectives of the present invention are satisfied by providing a terminal housing having a liquid tight support for receiving a plurality of cables through one wall of said housing. Said support wall comprises a plurality of members which slidably engage with vertical posts on said housing. This arrangement results in a liquid seal between said members and said housing posts.

Each of said support members, which are formed of resilient material and adapted to interengage with an adjacent member, is provided with one or more semicylindrical depressions for receiving the said cables. In the assembled state, each of said depressions is aligned with another so as to form a substantially circular opening. Each of the openings may be further characterized a circumferential rib which yeilds on contact with the contained cables.

BRIEF DESCRIPTION OF THE DRAWINGS

FIG. 1 is an exploded perspective view of the terminal housing of this invention, less the electrical cables to be secured therein.

FIG. 2 is an exploded and enlarged front view of three exemplary resilient support members used in the terminal housing of this invention.

FIG. 3 is a side view of the support members shown in FIG. 2.

FIG. 4 is a sectional view taken through the support members of FIG. 2 along the line 4—4.

DETAILED DESCRIPTION OF PREFERRED EMBODIMENT

Referring more particularly to the FIGURES just described, the numeral 10 denotes the terminal housing of this invention. Said housing comprises generally a first wall 12, two vertical posts 14 having perpendicular portions 16 and 18, and a base 20. Through said first wall 12, means 22, such as a male or female electrical connector, are provided to electrically connect a source of current to the plurality of cables to be connected thereto. While the structure or design of means 22 is not critical to the full understanding and appreciation of this invention, reference is made to Ser. No. 29,873, entitled "SAFETY ELECTRICAL CONNECTOR", wherein an electrical connector is disclosed and which is applicable for use herein. However, such a construction for said electrical connector should not be read as a limitation on this invention.

Since, as explained above, a plurality of pairs of cables are brought into said housing 10 for connection there-with, suitable means are provided on said electrical connector 22 for accomplishing same. For example, slots 24 and 26 are provided along the connector for insertion of one cable from each pair, such that all pairs are ultimately connected in parallel with the said connector 22. Side slots 28 are included to give access to and firmly connect each of said cables. But again, other means are contemplated for making said connections.

Turning now to a more detailed discussion of the housing 10, in particular the resilient support members formed of rubber, neoprene and the like and designated generally by the numeral 30, it will be noted that only three are illustrated. It will be apparent from the following description that the number of individual support members may vary from two to several, practical considerations or design criteria will actually dictate the number needed.

While a perspective view of said members is shown in FIG. 1, the remaining FIGURES illustrate perhaps in greater detail the special features thereof. Accordingly, particular attention is directed to FIGS. 2 - 4.

It will be observed that the uppermost support member 30a, with one minor addition, is a mirror image of the lowermost support member 30b. Thus, a description of one should suffice to describe the other.

Each of said last named support members are characterized by front faces 32a, 32b and rear faces 34a, 34b, respectively. With respect to support member 30b, the bottom 36b has been provided with a continuous channel 38b which seats on flange 40, the flange 40 comprising an inturned portion of the housing intermediate perpendicular portions 16. The top 42b is similarly channeled at 44b to interengage with suitable projections on the adjacent support member 30c. This arrangement shall be explained in greater detail hereinafter.

In each of said support members, one or more through semicylindrical depressions 46a, 46b, 46c, are provided perpendicular to the front and rear faces of the respective support members. Further, each of said semicylindrical depressions is aligned with another in an adjacent support member so that a number of circular openings are formed when the said support members are in the assembled condition. Finally, each of said depression are provided with one or more semicylindrical ribs 48a, 48b, 48c, 48c', which when aligned with another, will form an annular ring within each said circular opening. Due to the resilient nature of the support members, said ribs when enclosed around a pair of cables will readily deform to effect a liquid tight seal about said cables.

The middle support member 30c is constructed so as to compliment the adjacent support members 30a, 30b. That is, the top and bottom are provided with projections 50 and 52 which are shaped to be fitted into channels 38a and 44b respectively. This tongue and groove arrangement is sufficient to provide a liquid tight seals at the junctions formed by adjacent support members.

To effect a liquid tight seal between the side edges of the support members and the vertical posts 14, vertical slots 54a, 54b, 54c are provided on the sides thereof, as seen in FIG. 3. Said slots slidably engage with the post portions 16.

Finally, to securely engage said support members in an assembled condition, where the most effective state is one in compression, a number of aligned vertical through holes 56 are provided in each of said support members. Within the upper channel 44a, a plate 58, such as metal or the like, is arranged to receive a number of long fastener members (not shown) which pass through the holes 56 and engage threaded holes 60 in the flange 40. Thus, by tightening the fastener members, the downward movement of plate 58 tends to compress together the engaged support members, thereby further assuring a liquid tight seal through this face of the housing.

The effectiveness and relative simplicity of this structure may be demonstrated by a step-by-step analysis of the assembly.

1. The housing portion as shown in the lower third of FIG. 1, with the electrical connector 22 in wall 12, is engaged by support member 30b; i.e. sliding said member along slots 54b until channel 38b contacts flange 40.

2. Connect a pair of cables, one through slot 24 and the other through slot 26. Access means 28 are provided on each side of the connector 22 to secure the cables.

3. The pair of cables are then placed in one of the depressions 46b where they may be optionally wrapped or collared in some suitable manner.

4. Steps 2 and 3 are then repeated with a second pair of cables, except that the connected pair is placed in the other of the depressions 46b.

5. The second support member 30c is then slid down upon and engaged with support member 30b. By this arrangement, the connected pairs of cables are enclosed by the respective aligned semicylindrical depressions.

6. Steps 2 and 3 are again repeated until a pair of connected cables are placed in each of the depressions 46c.

7. At this stage four pairs of cables have been connected to electrical connector 22 and passed through or on the support members 30b, 30c. The final support member 30a is now brought into engagement with support member 30c.

8. The support members 30 are then firmly secured within the housing 10 by threaded fasteners received in support holes 56 and threaded into holes 60.

9. As a final step, cover 62 is placed over the assemblage above and suitably fastened, such as along the edges with threaded bolts or the like.

It should be apparent from the description above that modifications may be made to this invention. For example, the number of support members 30, and/or hemispherical depressions, may vary depending on the size and number of pairs of cables to be brought into the housing 10. Further, the interengaging or tongue and groove arrangement may be reversed on adjacent support members. That is, the channel may be provided on the support member 30c with the projection, for example, on support member 30b.

Since modifications are contemplated herein, no limitation is intended to be imposed on this invention except as set forth in the appended claims.

I claim:

1. In a terminal housing having a liquid tight cable receiving wall through which a plurality of cable sets pass from the exterior to the interior of the housing, said housing having a spaced apart pair of parallel posts defining the opposite side edges of said wall and a seat forming flange defining the bottom edge thereof, said posts having tongue defining longitudinal edges, at least two juxtaposed resilient dielectric clamping members extending between said posts, said clamping members being of generally rectangular configuration and having slots in their opposite ends slidably engaging the tongue defining edges of said posts to effect sealing engagement therewith, mating channels and projections extending along the juxtaposed surfaces of said clamping members to effect a seal therebetween, the undermost clamping member having a channel extending along its undermost surface in sealing engagement with said seat forming flange, said clamping members each containing at least one semicylindrical depression positioned to be aligned with an opposing semicylindrical depression in an adjoining clamping member, each said pair of aligned depressions defining a cable receiving opening, a semicircular rib in each said depression in alignment with the rib in the opposing depression to define a cable engaging annular sealing ring within each said opening, and clamping means for securing said clamping members together in sealed contact with each other and with cable sets received in said openings, whereby said cable receiving wall is effectively sealed to said housing and to the cable sets passing through the openings therein.

2. The terminal housing claimed in claim 1 wherein there are three clamping members juxtaposed one upon the other, the intermediate clamping member having semicylindrical depressions therein aligned with opposing semicylindrical depressions in each of the remaining clamping members.

3. The terminal housing claimed in claim 2 wherein each of said depressions is provided with two parallel ribs, each of which is positioned to be aligned with a mating rib in the opposing depression to define a pair of annular sealing rings within each opening.

4. The terminal housing claimed in claim 1 wherein said clamping means includes a clamping plate engaging the upper surface of the uppermost clamping member.

5. The terminal housing claimed in claim 4 wherein said clamping members have aligned openings therein extending between said clamping plate and said seat forming flange, and wherein clamping bolts extend between and engage said plate and said seat forming flange.

* * * * *